G. F. THORP.
OSCILLATING PEN.
APPLICATION FILED MAY 14, 1912.

1,058,924.

Patented Apr. 15, 1913.

Witnesses:
Marie H. Lehr
Emma A. McCarrick

Inventor:
George Francis Thorp
by L. K. Böhm
Attorney.

UNITED STATES PATENT OFFICE.

GEORGE FRANCIS THORP, OF LONDON, ENGLAND.

OSCILLATING PEN.

1,058,924.  Specification of Letters Patent. Patented Apr. 15, 1913.

Application filed May 14, 1912. Serial No. 697,296.

*To all whom it may concern:*

Be it known that I, GEORGE FRANCIS THORP, subject of the King of Great Britain, residing at London, England, have invented certain new and useful Improvements in Oscillating Pens, of which the following is a specification.

This invention relates to stippling pens for use by artists and others, of the type in which a pivotal connection is provided between the nib holder and stem, said nib holder being adapted to be oscillated about the pivoting point, and has for its object to provide an improved pen of this type of simple construction, which is portable and which is not liable to get out of order.

According to the present invention, I provide a stippling pen having a nib holder pivoted upon a stem or projection thereon, and connected with a vibrator such as an eccentric, by means of a wire, for the purpose of transmitting a vibratory or oscillatory movement to said nib holder.

The invention also comprises the particular construction, combination and arrangement of parts as hereinafter described.

Figure 1:
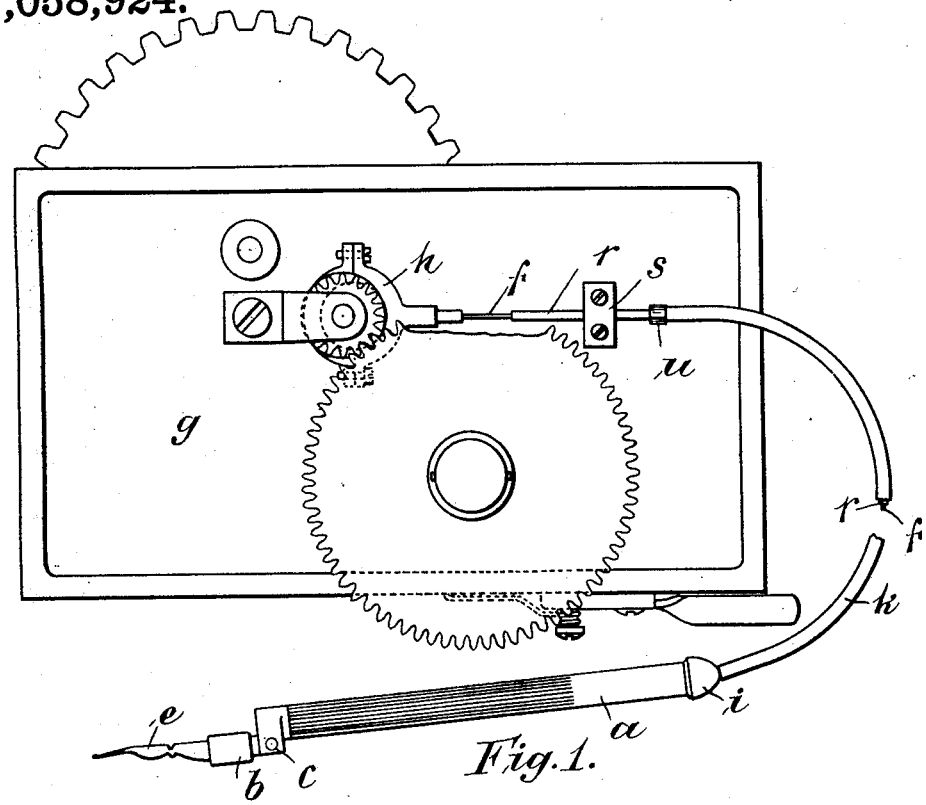
Figure 2:
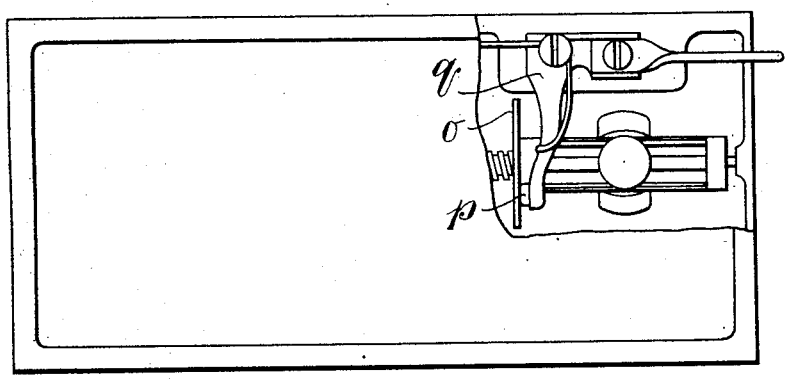
Figure 3:
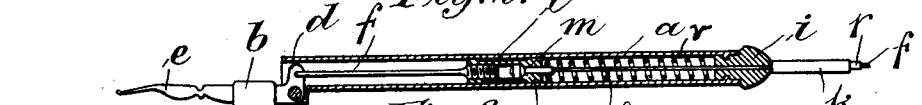

In the accompanying drawings:—Figure 1, is a plan showing the pen and its vibrating mechanism. Fig. 2, is a side elevation of the motor, the vibrating mechanism part of the casing being broken away to show the brake disk. Fig. 3, is a detail section of the pen.

In carrying out the invention, according to one form, the stem $a$, of the pen is provided at one end with a nib holder $b$, which is pivoted at $c$, to the stem. The nib holder $b$, which is adapted to receive a nib $e$, of any usual form, is free to oscillate or vibrate about its pivot $c$.

For the purpose of vibrating or oscillating the holder $b$, said holder is provided with an arm $d$, to which one end of a flexible wire $f$, is secured, the wire being in turn vibrated by a suitable vibrator such as an eccentric $h$, driven by a suitable motor such as a clockwork motor $g$.

In order to permit of free movement of the stem $a$, by the artist, it is freely mounted in a cap $i$, secured to the usual tubular casing $k$, of the wire $f$, and the wire itself is divided, and the adjacent ends $l$, $m$, at the point of division are free to rotate within the swivel connection or union $n$. The flexible wire $f$, passes through a sheath $r$, of coiled wire, which sheath is fixed at one end by a clamp $s$, on the motor. An outer sheath $t$, surrounds the first and forms a protection against kinking. The outer sheath abuts at one end against a collar $u$, on the inner sheath and is loosely mounted, being independent of the inner sheath. The motor $g$, may be provided with any usual means for regulating its speed so as to permit of the vibrations of the nib $d$, being varied to suit the convenience of the artist or the class of work upon which he is engaged. For instance, a brake disk $o$, may be retarded more or less by a brake pad $p$, carried by a bell-crank lever $q$, as usual in clockwork motors.

A spring $v$ is provided in the stem $a$ surrounding the wire $f$ as shown in Fig. 3. This spring assists the wire $f$ in its return movement.

By means of a pen such as described, an artist or other person can rapidly stipple a comparatively large surface without experiencing fatigue, as all that is necessary, after the motor has been started at the required speed, is to move the pen lightly over the surface to be stippled.

I claim:

1. An automatic stippling pen comprising in combination, a stem, a nib holder pivoted thereon, a wire connected with said nib holder and means for vibrating said wire for the purpose of imparting oscillations to the nib holder, substantially as hereinbefore set forth.

2. An automatic stippling pen comprising in combination, a stem, a nib holder pivoted thereon, a wire connected with said holder, and means for vibrating said wire consisting of an eccentric and means for driving said eccentric, substantially as hereinbefore set forth.

3. An automatic stippling pen comprising in combination, a stem, a nib holder pivoted thereon, a wire connected with said nib holder, said wire being divided, a swivel joint between the two portions of said wire, and means for vibrating said wire, substantially as and for the purpose hereinbefore set forth.

4. An automatic stippling pen, comprising in combination, a stem, a nib holder pivoted thereon, a flexible wire connected with said nib holder, a coiled wire sheath around said wire, an eccentric for vibrating said wire, and a clockwork motor for driving said eccentric, substantially as hereinbefore described.

5. An automatic stippling pen, comprising in combination, a stem, a nib holder pivoted thereon, a flexible wire connected with said nib holder, a non-vibratory sheath for said wire, means such as an eccentric for vibrating said wire, a motor for driving said eccentric, said motor having a speed regulator for the purpose of enabling the speed of the motor and therefore the speed of oscillation of the nib holder to be varied, substantially as hereinbefore set forth.

6. An automatic stippling pen, comprising in combination, a stem, a nib holder pivoted thereon, a flexible wire connected with said nib-holder, a vibrator connected to said wire, a motor for driving said vibrator, a coiled wire sheath for the wire, said sheath having one of its ends rigidly connected with the motor casing, and a second sheath surrounding the aforesaid sheath and loose thereon, substantially as hereinbefore described.

7. An automatic stippling pen comprising in combination, a stem, a vibratory nib with holder pivoted to the stem, a flexible wire connected with said holder, a coiled spring within the stem surrounding part of the flexible wire tending to draw said wire rearwardly, a motor, means driven thereby for imparting vibrations to the wire, nib holder and nib, and a speed regulator for the motor to vary the vibrations of the nib consisting of a brake disk, a disk retarding brake pad, and a bell crank lever carrying said pad.

In testimony whereof I have signed my name to this specification in the presence of two subscribing witnesses.

GEORGE FRANCIS THORP.

Witnesses:
FREDERICK JAMES SWALLOW,
THOMAS GRIFFIN COMERFORD.

---

Copies of this patent may be obtained for five cents each, by addressing the "Commissioner of Patents, Washington, D. C."